United States Patent
Jensen

(10) Patent No.: US 8,920,130 B2
(45) Date of Patent: Dec. 30, 2014

(54) CIRCULATING PUMP UNIT WITH COMMUNICATION INTERFACE

(75) Inventor: Kim Hulegaard Jensen, Rodkaersbro (DK)

(73) Assignee: Grundfos Management a/s, Bjerringbro (DK)

(*) Notice: Subject to any disclaimer, the term of this patent is extended or adjusted under 35 U.S.C. 154(b) by 599 days.

(21) Appl. No.: 13/057,213

(22) PCT Filed: Jul. 16, 2009

(86) PCT No.: PCT/EP2009/005158
§ 371 (c)(1),
(2), (4) Date: Feb. 2, 2011

(87) PCT Pub. No.: WO2010/015318
PCT Pub. Date: Feb. 11, 2010

(65) Prior Publication Data
US 2011/0135515 A1    Jun. 9, 2011

(30) Foreign Application Priority Data

Aug. 4, 2008 (EP) .................. 08013958.7

(51) Int. Cl.
| | |
|---|---|
| F04D 15/00 | (2006.01) |
| F04D 13/06 | (2006.01) |
| F24D 3/08 | (2006.01) |
| F24D 11/00 | (2006.01) |
| F24D 17/00 | (2006.01) |
| F24D 19/10 | (2006.01) |

(52) U.S. Cl.
CPC *F04D 15/00* (2013.01); *F24D 3/08* (2013.01); *F24D 11/003* (2013.01); *F24D 11/004* (2013.01); *F24D 17/0021* (2013.01); *F24D 17/0031* (2013.01); *F24D 19/1009* (2013.01); *F24D 19/1012* (2013.01); *F04D 13/0686* (2013.01); *F24D 2220/2009* (2013.01); *F24D 2220/2081* (2013.01); *F24D 2220/209* (2013.01); *Y02B 10/20* (2013.01); *Y02B 30/745* (2013.01)
USPC .................. 417/32; 417/44.1; 417/5; 417/26

(58) Field of Classification Search
CPC .. F04D 13/0686; F04D 15/00; F24D 19/1012
USPC .................. 417/2, 5, 26, 32, 44.1; 62/228.1
See application file for complete search history.

(56) References Cited

U.S. PATENT DOCUMENTS 4,018,584 A * 4/1977 Mullen ............................ 62/175
4,137,014 A * 1/1979 Parker ............................ 417/326

(Continued)

FOREIGN PATENT DOCUMENTS

| EP | 1 209 364 A2 | 5/2002 |
|---|---|---|
| EP | 1 355 212 A1 | 10/2003 |
| JP | 09113062 A * | 5/1997 |

OTHER PUBLICATIONS

English Abstract of JP09113062A dated May, 2, 1997.*

(Continued)

*Primary Examiner* — Charles Freay
*Assistant Examiner* — Nathan Zollinger
(74) *Attorney, Agent, or Firm* — Panitch Schwarze Belisario & Nadel LLP

(57) ABSTRACT

A circulation pump assembly (1) includes an electric drive motor (6) and a control device (10, 12) for the control of the drive motor (6). The control device (12) includes a communication interface (13) designed for connection to at least one external sensor (38, 50, 52, 54, 56) and/or at least one further assembly (40, 42, 44, 46, 48, 58, 62, 64, 66, 68) to be controlled by the control device, as well as to a heating installation and/or air conditioning installation with such a circulation pump assembly (1).

9 Claims, 2 Drawing Sheets

(56) References Cited

U.S. PATENT DOCUMENTS

| | | |
|---|---|---|
| 6,139,281 A | 10/2000 | Schooler |
| 6,401,468 B1* | 6/2002 | Hoyle et al. .................... 62/175 |
| 7,287,395 B2* | 10/2007 | Nash, Jr. ......................... 62/175 |
| 2002/0059841 A1 | 5/2002 | Pinnerup et al. |
| 2003/0066302 A1* | 4/2003 | Ueno ............................. 62/192 |
| 2004/0182439 A1 | 9/2004 | Popper et al. |
| 2004/0244393 A1* | 12/2004 | Lucas et al. .................... 62/186 |
| 2005/0014991 A1* | 1/2005 | Sugiura .......................... 600/17 |
| 2007/0000660 A1 | 1/2007 | Seerup et al. |
| 2007/0144193 A1* | 6/2007 | Crane et al. ................. 62/228.4 |
| 2007/0154322 A1* | 7/2007 | Stiles et al. .................. 417/44.1 |
| 2008/0072611 A1* | 3/2008 | Ahmed et al. .................. 62/175 |
| 2008/0179416 A1 | 7/2008 | Johnson et al. |
| 2010/0313584 A1* | 12/2010 | Lopez et al. .................... 62/171 |
| 2013/0330205 A1* | 12/2013 | Apostolides et al. ........... 417/12 |

OTHER PUBLICATIONS

Int'l Search Report issued on Jan. 28, 2010 in Int'l Application No. PCT/EP2009/005158.

Office Action issued Oct. 23, 2012 in RU Application No. 201170298131.

* cited by examiner

CIRCULATING PUMP UNIT WITH COMMUNICATION INTERFACE

CROSS-REFERENCE TO RELATED APPLICATIONS

This application is a Section 371 of International Application No. PCT/EP2009/005158, filed Jul. 16, 2009, which was published in the German language on Feb. 11, 2010, under International Publication No. WO 2010/015318 A3 and the disclosure of which is incorporated herein by reference.

BACKGROUND OF THE INVENTION

The present invention relates to a circulation pump assembly, as well as to a heating installation and/or air conditioning installation with such a pump assembly.

Usually, numerous circulation pumps are present in heating installations and air conditioning installations, in particular in larger installations. Usually, a central control unit is provided for the central control of the pumps, which is connected to the individual pumps via cable. Moreover, one may yet also provide sensors in the installation, which again are connected to the central control device with cables. It is particularly with heating installations with thermal solar collectors that a complicated wiring is required, since the individual installation components lie far apart. The solar collectors are usually arranged on the roof of a building, whereas the heating installation and the control unit are usually arranged in the basement. In order to be able to properly take into account the available thermal quantity of the solar installation, suitable sensors which notify the control of the circulation pumps with regard to the available thermal power, must be provided on the solar collectors.

BRIEF SUMMARY OF THE INVENTION

It is therefore an objective of the present invention, to permit a simplified construction or a simplified installation of a heating installation and/or air conditioning installation.

The above objective is achieved by a circulation pump assembly with the features specified in the independent claim(s), as well as by a heating installation and/or air conditioning installation with the features specified in certain dependent claims. Preferred embodiments are to be deduced from the associated dependent claims, the subsequent description, as well as the attached drawings.

The circulation pump assembly according to the present invention, as with known circulation pump assemblies, is provided with an electrical drive motor as well as a control device for the control of the drive motor. The control device in particular may comprise a frequency converter for the control of the rotational speed of the drive motor. According to the present invention, the control device moreover comprises a communication interface, which is designed for connection to at least one external sensor and/or at least one further assembly to be controlled by the control device. Preferably, the control device is designed such that it may assume the function of an external control unit, as it is used in known installations. In this manner, the wiring effort between the pump and the external control unit is done away with, since the complete control device is integrated into the circulation pump assembly. The communication interface thereby permits the control device to communicate with further installation components, in particular with further assemblies which are to be controlled and regulated (controlled with a closed loop). For example, the control device of a circulation pump assembly or of a pump may simultaneously assume the control or regulation of further assemblies, as an external control unit does in known installations. Moreover, sensors which supply the control device with installation parameters, in order to be able to control the pump in dependence on these parameters, may be connected via the communication interface.

By way of the integration of such a control device, which is designed for the control and communication with further installation parts, into a circulation pump assembly, the effort with regard to installation and wiring in the heating installation or air conditioning installation is significantly simplified.

Preferably, the communication interface for the wireless signal transmission in particular is formed by radio. The installation is further simplified by way of this, since a wiring between the individual installation components, which are to be controlled by the control device of the circulation pump assembly, may be done away with. Furthermore, one may also provide possible sensors with interfaces for wireless, in particular radio transmission, so that the sensors may also communicate with the control device of the circulation pump assembly in a wireless manner. Thus, for example, with a solar installation, a temperature probe arranged on the roof may communicate with the pump assembly in the basement of the building via radio. This considerably simplifies the installation. The communication interface is preferably designed in a manner, or is provided with a protocol for data communication which permits an unambiguous coupling to other communication modules or installation parts, such that a secure communication between the individual installation parts is possible.

Further preferably, the control device is designed in a manner such that the drive motor is controllable by the control device in dependence on data received via the communication interface. This data may for example be received by sensors, in particular temperature sensors and flow sensors. For example, the control device may obtain temperature data from a solar collector or water storage device, and control associated circulation pumps and valves in dependence on the water temperatures which are available there. In particular, the circulation pump, into which the control device is integrated, may be controlled. Furthermore, however, one may also control further centrifugal pumps via the communication interface, as described in more detail hereinafter.

According to a further preferred embodiment of the present invention, the control device is designed in a manner such that it may send data via the communication interface to an external assembly which is controlled in dependence on these data. The external assembly may for example be a further pump or a valve, or for example also a boiler control of a heating installation. The control device of the circulation pump assembly thus here, via the communication module, may provide feedback to other installation parts or also co-control other installation parts, so that the circulation pump assembly with the integrated control device, may assume the function of an external control unit for the pump control which was provided until now, as has been described previously. For this, it may send control data to these other installation parts or assemblies, for example, for switching on and off.

Further preferably, the control device is therefore designed in a manner such that via the communication interface, it may control at least one further pump and/or an external valve, and/or may receive data from these, i.e. from an external pump and/or an external valve. Thus, the control device via the communication interface may switch further pumps on and off, or also regulate them with regard to their rotational speed as the case may be, in particular in dependence on current installation parameters, which for example may be received from the sensors, likewise via the communication interface. Valves may also be opened or closed, for example mixer valves or likewise. The further pumps and/or valves for this are equipped with suitable communication interfaces and adapted control devices and regulation devices, which control or set these components in dependence on the signals or control data received by the main circulation pump. Particularly preferably, with regard to an external valve, it may be the case of a multi-way valve and/or proportional valve.

Moreover, the external further pumps and/or valves which are to be controlled by the control device of the pump assembly, may be designed such that they may send data to the control device of the main circulation pump assembly. For this, these external assemblies are provided with suitable communication interfaces. Thus installation parameters may be detected in the external assemblies, i.e. valves or further pumps, and be notified to the central control device in one of the circulation pumps. Moreover, operating conditions of the individual assemblies, for example valve positions or pump rotation speeds, may be transmitted via the communication interfaces to the control device, which the central installation control adopts. This control device receives the data via its assigned communication module.

According to a particularly preferred embodiment of the present invention, the control device is provided with a repeater for receiving and for further transmission of signals. Also, further installation parts which are provided with communication interfaces, for example sensors, valves or further pumps, may preferably additionally contain such repeaters, e.g. in their communication modules. The repeaters are in particular provided for the wireless signal transmission, e.g. via radio. One may very easily construct a linking up over large distances by way of such repeaters in the individual installation components. Thus distances may be bridged, for which normal transmission power of the communication modules would not be sufficient. For example, a signal from a temperature sensor on the roof may firstly be received by a communication module in a valve or in a further pump and then, as the case may be, may be transmitted further in an amplified manner to the communication module of the control device, which assumes the installation control. Preferably, the communication modules of the individual assemblies or installation parts are designed such that they themselves set the optimal path for the data transmission, i.e., that the chain of repeaters, via which the signals are transmitted, do not need to be fixed manually, but the signals in the network formed by the individual assemblies with their communication modules automatically seek their path.

According to a particular embodiment of the present invention, the control device is formed of at least one module which may be integrated into the circulation pump assembly in an exchangeable or optional manner. This permits a less expensive manufacture of the circulation pump assembly. Thus the part of the control device which is responsible for the control of the installation, i.e. the control of further assemblies and comprises the communication module, may be designed as a module which may be optionally integrated into the circulation pump. For example, one and the same circulation pump may be equipped with this additional control module or without this additional control module. If the circulation pump assembly is designed without this additional control module, it only has the conventional control device, which is required for the normal control or regulation of the drive motor, for example rotational speed control. It is also conceivable to provide a control module, which may assume the installation control, and a further optional module, which is designed as a receiver module and is integrated into such circulation pumps which function as dependent (slave) pumps, i.e. which are controlled by another circulation pump assembly. Thus the pumps may be applied for different purposes in a simple manner by way of simply integrating the respective modules for the control and communication. These exchangeable control modules and communication modules, apart from the electronic components for the control, for data transmission etc., may additionally yet comprise input and display elements. In particular that control module which is provided for the central control of further installation parts, preferably comprises input means and display means for setting the installation or the system. Additionally, one may also provide an interface for the connection of programming devices and setting devices, for example for connection to a computer for programming the control device, e.g. a USB-interface or a network connection. The repeater mentioned above may also be provided as an optional module. It is thus possible to integrate suitable repeaters only in a few of the installation parts, i.e., where they are indeed required. Alternatively, it is however conceivable to integrate such repeaters into the communication modules in a fixed manner.

The present invention further relates to a heating installation and/or to an air conditioning installation, which comprise at least one circulation pump assembly according to the preceding description. Such a heating installation and/or air conditioning installation may however also comprise several such circulation pump assemblies.

Preferably, the heating installation and/or air conditioning installation comprises at least one sensor, in particular a temperature sensor, which is connected to the communication interface of the described circulation pump assembly, for data transmission, and the drive motor of the circulation pump assembly may be controlled by its control device in dependence on the data transmitted by the sensor. For this, the sensor comprises a corresponding communication module. The communication modules may for example be designed for the wireless data transmission, in particular via radio. Alternatively however, a wired communication is also possible. The control device of the circulation pump assembly may switch the drive motor on or off, or control and regulate it with regard to the rotational speed, in dependence on the received signal from the sensor.

Preferably, the sensor is a temperature sensor, which is arranged on at least one solar collector and/or a water storage device. Thus for example, the described circulation pump may be arranged in the circuit to the solar collector, and be controlled by the control device, such that the rotational speed of the drive motor is changed and/or the circulation pump assembly is switched on or off, in dependence on the temperature detected by the temperature sensor on the solar collector. A corresponding control would be possible in the circuit to the water storage device. Thereby, it is conceivable for circulation pump assemblies with suitable control devices and communication interfaces to be provided in several different circuits, wherein one of the circulation pumps assumes the central control function and controls the other circulation pump assemblies via the communication interface, i.e., sets their rotational speed and/or initiates a switching on and off of the associated drive motors.

The communication interface of the circulation pump assembly is preferably designed for the wireless signal transmission, and the sensors and/or assemblies which are provided for communication with the communication interface, are designed with corresponding interfaces for wireless signal transmission. Thus a simple communication between the different installation parts or assemblies may be achieved, which may be put into operation without complicated wiring and installation measures.

Preferably, at least a part of the sensors and/or assemblies is in each case equipped with a repeater for receiving and further transmission of signals. Thus the individual installation components may serve simultaneously for increasing the overall range of the radio network which is built up in such a manner, since data may be transmitted further from one sensor or assembly, to the other, and thus in particular to the control device of the main (master) pump assembly, via the repeaters. Vice versa, control signals of the main pump assembly may be led further to other assemblies and installation parts in this manner.

Particularly preferably, the circulation pump assembly described above forms a main (master) pump in the heating installation and/or air conditioning installation, said main (master) pump being connected via the communication interface to at least one auxiliary (slave) pump for data transmission, wherein the auxiliary pump comprises a control device, which is designed for the control of the auxiliary pump in dependence on data which it receives from the main pump. The auxiliary pump comprises an interface corresponding to the communication interface of the main pump, for the data exchange, in particular an interface for the wireless signal transmission as described previously. The control device of the auxiliary pump may be a special control module, which is specially adapted to the functions which are necessary for the auxiliary pump. Alternatively, the control device or the control module may also be designed identically to the control device of the main pump, and the different function may be realised only by another setting of the control device. I.e., in this case, one may provide a universal control module independently of which function the circulation pump assumes in the heating installation, i.e. whether it is the main pump or auxiliary pump. Preferably however, one may provide different control modules which as described above, may be applied into a circulation pump assembly in a modular manner, in order to adapt the circulation pump assembly to its respective application purpose.

The main pump, as already described above, is designed such that its control device may assume the function of a central control device, preferably for several or all pumps in the installation and, as the case may be, further installation parts such as valves etc. For example, the main pump replaces the separate control device which was required until now.

Further preferably, the described circulation pump assembly forms a main pump which is connected via the communication interface for data transmission, to at least one auxiliary pump, wherein the communication interface of the main pump is designed for receiving data of the auxiliary pump, and the control device of the main pump is designed to control the main pump, in dependence on the received data. Thus, the auxiliary pumps may simultaneously serve as sensors, and send certain installation parameters to the main pump, so that the main pump is then controlled by its control device in dependence on the installation parameters. The control device of the main pump may simultaneously also control further installation components, for example further pumps or for example valves, in dependence on these parameters which it has received from the auxiliary pumps. In particular, the auxiliary pumps may also provide feedback to the central control device of the main pump, for example with regard to the current delivery flow or likewise. One may also transfer errors in this manner to the central control device, which forms the control device of the main pump. There they may then be brought to display at a central display device, which is provided on the circulation pump assembly which forms the main pump. It would also be conceivable to connect further display systems or control systems to this main pump, so that any errors may for example be notified further to a central house control via a suitable network.

The main pump may also comprise internal sensors which transmit their signals to the control device.

According to a further preferred embodiment of the present invention, the control device of the circulation pump, i.e. of the main pump in the case of several pumps, is connected via the communication module to two temperature sensors, to one on a solar collector and a second temperature sensor on a water storage device. The control device is then designed such that it starts the circulation pump, i.e. its drive motor, when the temperature detected by the temperature sensor on the solar collector lies above the temperature detected by the sensor on the water storage device, by a predefined value. Accordingly, the control device is also designed such that it switches off the drive motor of the circulation pump when the temperature which is detected on the water storage device, exceeds the temperature which is detected on the solar collector, by a predefined value. In this context, it is to be understood that when one speaks of a water storage device, one may also mean a storage device of another heating medium, depending on what kind of fluid is used for heat transport in the heating installation.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

The invention is hereinafter described by way of example by way of the attached figures. There are shown in the drawings.

DETAILED DESCRIPTION OF THE INVENTION

Figure 1:
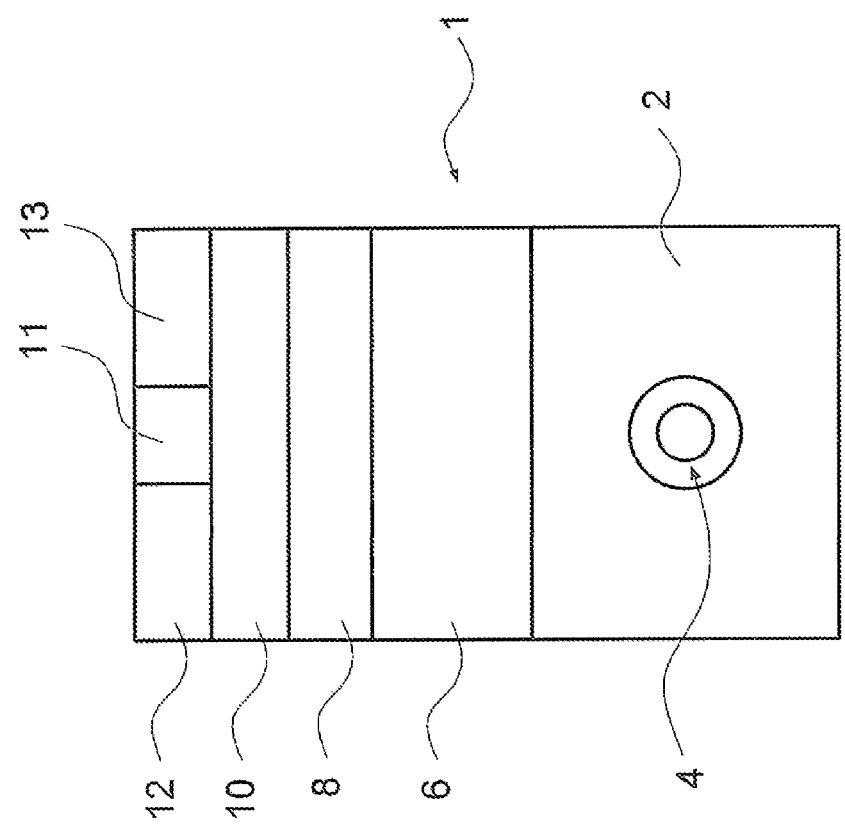
FIG. 1 is a schematic view of a pump assembly according to a preferred embodiment of the present invention.

Certain terminology is used in the following description for convenience only and is not limiting. The words "lower," "upper," "top" and "front" designate directions in the drawings to which reference is made. Unless specifically set forth herein, the terms "a," "an" and "the" are not limited to one element, but instead should be read as meaning "at least one." The terminology includes the words noted above, derivatives thereof and words of similar import.

Referring to the drawings in detail, wherein like numerals indicate like elements throughout the several views, FIG. 1 schematically shows the essential components of a circulation pump assembly or pump assembly 1, according to a preferred embodiment of the present invention. The shown pump assembly 1 comprises a pump housing 2 with an inlet 4 and with an outlet (not shown). Moreover, a drive motor 6 is arranged on the pump housing 2 or in the pump housing 2, and in this case is activated via a frequency converter 8, in order to be able to set the rotational speed of the drive motor 6. Moreover, a software module 10 is provided, which carries out the normal control of the pump, for example the control of the rotational speed or regulation of the rotational speed. For example, the software module 10, which comprises suitable hardware components for the program sequence of the software, serves for the usual control of the drive motor 6. The circulation pump assembly 2 according to the present invention moreover comprises a control device in the form of a control module 12 which in a pump system or heating system, may assume the central control function for several components, as is explained by way of example with regard to FIG. 2.

The pump assembly 1 may furthermore yet comprise internal sensors, for example pressure probes or temperature probes, which transmit their output data further to the software module 10 and/or to the control module 12, so that these may control the drive motor 6 and/or further components of the heating installation as the case may be, in dependence on the data of the internal sensors. Moreover, the software module 10 or the control module 12 may comprise interfaces for data communication with a programming device, for example in the form of a computer. One may for example provide a network connection or a USB connection for this. This allows the control module or also the software module to be able to be set or programmed externally by way of a computer. Moreover, a networking to a building control system would also be conceivable.

The control module 12 comprises a communication module 13, i.e. a communication interface for communication with further assemblies or sensors in the heating installation. Moreover, in the example shown here, a repeater 11 is integrated into the pump assembly 1 and this repeater serves for leading further signals received by radio, to other installation parts or assemblies.

Figure 2:
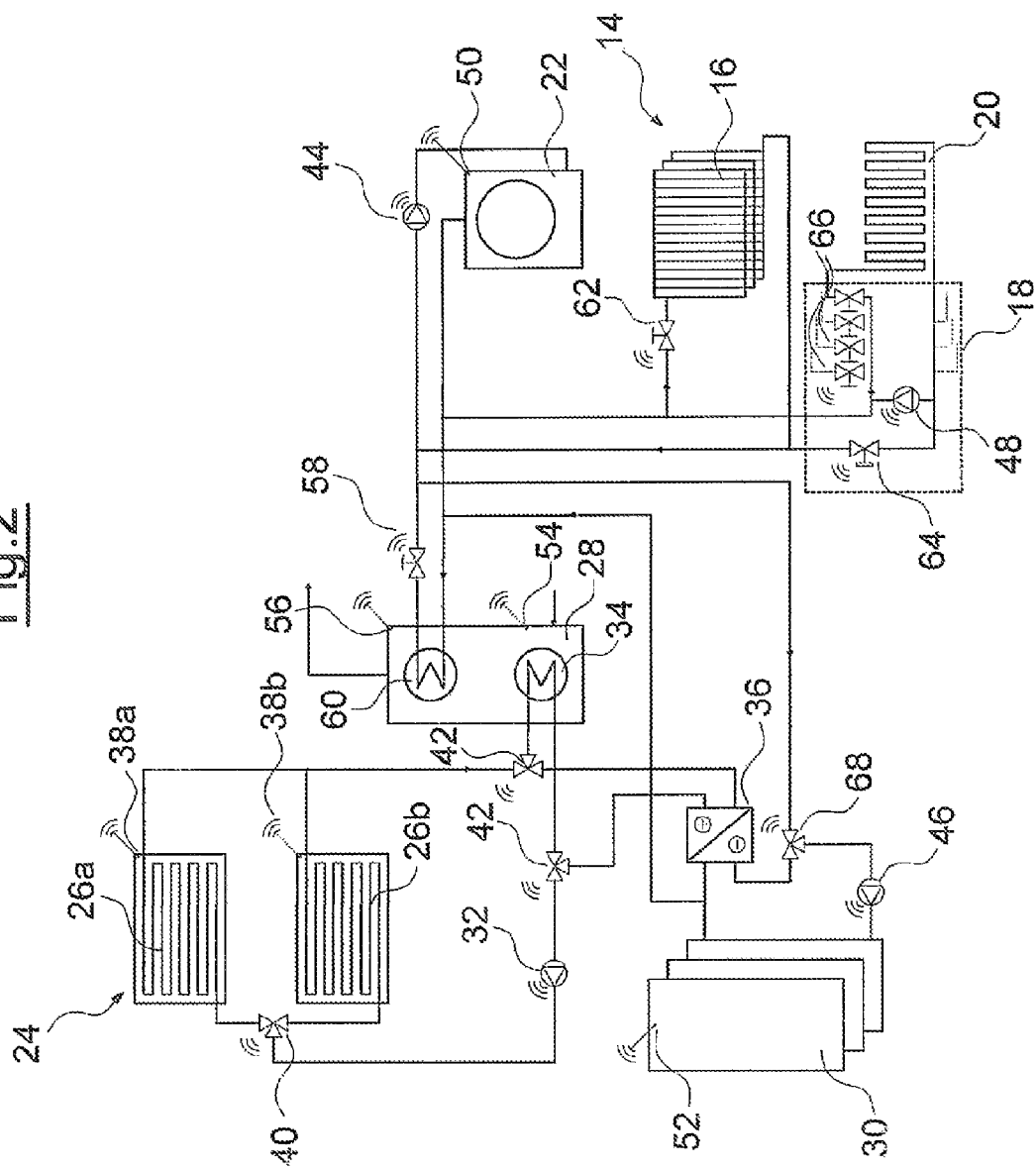
FIG. 2 is a schematic view of the construction of a heating installation according to a preferred embodiment of the present invention.

FIG. 2 by way of example shows a heating installation with several heating circuits. This on the one hand is a heating circuit 14 with normal radiators 16, and on the other hand a floor heating 18, again with several heating circuits 20. A heating boiler 22 and a solar installation 24, here with two solar collectors 26a and 26b, are provided for producing heat. Moreover, a service water storage device 28 for heating service water is provided. Furthermore, the installation yet comprises an external water storage device 30 for storing heated water of the heating circuit. The water storage device 30 serves for being able to store excess heat, which is produced by the solar collectors 26a and 26b.

The complete installation comprises numerous valves, sensors and pumps for the control, which are described in more detail hereinafter. With this embodiment example, these pumps, sensors and valves are connected to one another into a network in a wireless manner, i.e. they communicate amongst one another via radio. This permits a very simple installation of the installation, since the wiring effort for the control leads is done away with. The individual modules merely need to have an energy supply which may be effected by a simple mains connection or also in a different manner, in particular in the case of sensors, for example via solar cells or batteries.

A first circulation pump or a first circulation pump assembly 32, which forms the main pump or master pump 32, is provided in this installation. This main pump 32 then corresponds to the circulation pump assembly 1 explained by way of FIG. 1, and is arranged in the circuit of the solar installation 24 and delivers the water in the circuit of the solar installation 24 through the solar collectors 26a and 26b selectively to a heat exchanger 34 in the service water storage device 28 or in a heat exchanger 36, which forms the interface to the remaining heating circuit. Moreover, two temperature sensors 38a and 38b are provided on or in the solar collectors 26a and 26b, in the circuit of the solar installation 24. Moreover, three valves 40, 42 are provided in the circuit of the solar installation 24. The valve 40 serves for being able to connect the two solar collectors 26a, 26b selectively to the circuit. The valves 42 serve for being able to lead the water heated in the solar circuit 24 by the solar collectors 26a and/or 26b, selectively to the heat exchanger 34 and/or to the heat exchanger 36. The temperature sensors 38a, 38b as well as the valves 40 and 42 are equipped with interfaces for radio communication, as also a communication module is provided in the main pump 32 for radio communication with the previously mentioned components. Thus the main pump 32 may receive temperature values from the temperature sensors 38a and 38b via radio. Moreover, the main pump 32 or its control module 12 may control or actuate the valves 40 and 42 via the communication module 13, by way of radio.

Further pumps are provided in the remaining heating installation, which form auxiliary pumps. This on the one hand is the pump 44 which is situated in the circuit of the heating boiler 22 and conveys the water heated by the heating boiler 22. On the other hand this is the pump 46, which is situated in the circuit of the water storage device 30 and may then, in particular, deliver the water through the water storage device 30 and the heat exchanger 36. As a third pump, yet a pump 48 is provided in the circuit of the floor heating 18. This pump assumes mixer functions in the circuit of the floor heating. Moreover, further temperature sensors are provided, specifically a temperature sensor 50 in the heating boiler 22 or its water circuit, a temperature sensor 52 in the external water storage device 30, and two temperature sensors 54 and 56 in the service water storage device 28. Thereby, the temperature sensor 54 is arranged at the bottom and the temperature sensor 56 at the top in the service water storage device 28.

Moreover, further valves are provided in the installation, specifically a valve 58 in the branch of the heating circuit leading to the heat exchanger 60. The heat exchanger 60 is likewise provided in the service water storage device 28, for heating the service water alternatively to the heating by the heat exchanger 34. A further valve 62 is provided in the heating circuit 14. A valve 64 is also provided in the circuit of the floor heating 18. Moreover, further single-cylinder valves 66 are provided for the individual circuits 20 of the floor heating 18. Finally, yet a valve 68 is provided in the circuit of the water storage device 30, with which a switch-over of the circuit of the water storage device 30 from a circuit through the heat exchanger 36, to a connection with the complete heating circuit is possible.

All the previously mentioned temperature sensors 50, 52, 54, 56 and valves 58, 62, 64, 66, 68 comprise communication interfaces for the wireless communication amongst one another, and in particular with the communication interface or the communication module 13 of the main pump 32. The interfaces or the communication interfaces may furthermore contain repeaters, in order to be able receive radio signals and to transmit them further, so that the system may function with a lower transmitter power of the individual modules also over large ranges, for example in larger buildings. The individual installation parts, as the case may be, are separated spatially far from one another, for example the solar collectors 26a, 26b on the roof and the remaining heating installations in the basement, and the radiators 16 and the floor heating 18 in different rooms of the building.

With the shown installation, the main pump 32 assumes the control of the complete system, i.e. it controls the other pumps 44, 46, 48 as well as the valves 40, 42, 58, 62, 64, 66, 68. For this, it processes the signals or data which it obtains from the temperature sensors 38*a*, 38*b*, 50, 52, 54, 56 via radio. Moreover, the further pumps and valves may yet also contain sensors which transmit their data to the control module 12 of the main pump 32 via radio. Thus in each case, a bidirectional, in this case, wireless communication may be provided between the individual elements.

Now, important operational functions of the installation are described by way of example hereinafter. Thereby, the control module 12 of the main pump 32 forms a central control unit which controls the complete system. Thus, the control module 12 of the main pump 32 may control the valve 40, in order to ascertain which of the solar collectors 26*a*, 26*b* delivers heat into the circuit. Thus the solar collectors may be operated in an alternating manner or also simultaneously. The solar collectors 26*a*, 26*b* may for example be directed in different compass directions, for example the solar collector 26*a* to the south and the solar collector 26*b* to the south west. Then, the one or the other solar collector may be used, depending on the time of the day and the position of the sun. The main pump 32 for this control obtains temperature signals from the temperature sensors 38*a*, 38*b*, which detect the temperature of the solar collectors 26*a*, 26*b* respectively, i.e. of the fluid in these collectors. Thus the collector which has the desired nominal heat may be connected to the heating, and a collector which has a temperature which is too low may be disconnected. If the sensors 38*a*, 38*b* both signalise temperatures which are too low, then furthermore the control module 12 of the main pump 32 may also switch off the main pump 32 itself, so that water or heating medium may no longer be delivered through the circuit of the solar installation 24.

One ascertains via the valves 42, which are likewise controlled by the control module 12 of the main pump 32, as to whether the water heated by the solar collectors 26*a*, 26*b* is conveyed to the heat exchanger 34 of the service water storage device 28, or to the heat exchanger 36 via which the water in the water storage device 30 may be heated. The basis of this control are the output signals of the temperature sensors 54, 56, 52. If the temperature in the service water storage device 28 falls below a certain value, this is detected by the control module 12 of the main pump 32, which then accordingly switches the valves 42, so that water heated by the solar installation flows into the heat exchanger 34, and heats the service water in the service water storage device 28. Thereby, by way of the two temperature sensors 54, 56, one may detect whether only a part of the service water, specifically, only the upper part is heated, or whether the water in the complete service water storage device 28 has the desired temperature. Correspondingly, if the temperature value detected by the temperature sensor 52 falls below a nominal value, the valves 42 may be set by the control module 12 in the main pump 32, such that the water heated by the solar installation 24 flows through the heat exchanger 36, in order to bring the water in the water storage device 30 to the desired nominal temperature. Accordingly, the control module 12 of the main pump 32 may then again switch the valves 42, in order to switch off the heating of the service water in the service water storage device 28 or of the water in the water storage device 30, when the assigned temperature sensors 56, 54, 52 signalise a desired nominal temperature via radio.

The auxiliary pump 46 as well as the valve 68, which are likewise controlled by the control module 12 of the main pump 32, serve for controlling the heating of the water in the water storage device 30, as well as the heat removal from the water storage device 30. Thus the valve 68 may be switched such that the water is delivered by the pump 46 only through the heat exchanger 36. Thereby, the water storage device 30 is charged, i.e. the water therein is heated via the solar installation 24. In order to take the heat, the valve 68 is switched over, so that the pump 46 delivers warm water out of the water storage device 30 to the heat exchanger 60 in the service water storage device 28, in order to heat the water there. This control is likewise effected on the basis of the signals emitted by the temperature sensors 52, 54, 56. If the values of the temperature sensors 54, 56 fall short of a certain nominal temperature, and the temperature sensors 38*a*, 38*b* simultaneously signalise that the temperature in the solar collectors 26*a*, 26*b* is not sufficient for heating the service water 28, the control module 12 of the main pump 32 switches the valve 68 and sets the auxiliary pump 46 in operation, such that warm water stored in the water storage device 30 is led into the heat exchanger 60 for heating the service water in the service water storage device 28. If the temperature of the water in the water storage device 30, which is signalised to the main pump 32 via the temperature sensor 52, is likewise not sufficient, then the pump 44 may additionally be activated to convey water heated by the heating boiler 22 to the heat exchanger 60.

The valve 58 serves for being able to decouple the heat exchanger 60 from the heating circuit, when warm water from the water storage device 30 is to be used to supply the heating circuit 14 or the floor heating 18 with heat. Then, with a suitable setting of the valve 58, the heated water from the water storage device 30 is conveyed by the pump 46, to the heating circuit 14 and the floor heating 18. If thereby, the valve 58 is closed, the water may not flow into the heat exchanger 60. The valve 58 is also actuated by the control module 12 in the main pump 32. The actuation thereby is effected likewise in dependence on the temperature signals which are emitted by the temperature sensors 54, 56.

The heating circuit 14 and the floor heating 18 may be connected or disconnected via the valves 62, 64. These valves too may be actuated by the main pump 32 via radio, wherein this actuation may be effected on the basis of further temperature data which is detected by the additional temperature probes. Thus, the temperatures in the heating circuit 14 or in the circulation of the floor heating 18 may be detected, and the valves 62, 64 may be opened or closed in dependence on the nominal temperatures to be achieved there. This correspondingly applies to the control of the pump 48 which likewise as an auxiliary pump may be switched on and off, as well as controlled in its rotational speed, by the main pump 32. The pumps 44, 46, depending on the design, may either only be switched on or off, or also controlled in their delivery power by way of rotational speed adaptation, by the main pump 32. The control of the valves 66 for the individual circuits 20 of the floor heating may also be assumed by the control device in the main pump 32, in dependence on the output signals of further temperature probes, for example room temperature probes in the respective rooms to be heated by the heating circuits 20.

One may thus recognise that the main pump 32 or its control module 12 may assume the complete pump control and valve control in the heating installation. The complete communication, i.e. the exchange of sensor signals and control signals or control data is thereby effected via suitable communication interfaces or communication modules in the respective components, i.e. sensors, valves or pumps, by radio in the shown example.

In the shown preferred embodiment example, the function of the circulation pump assembly, and the communication with further installation components, according to the present invention, has been described with the example of a heating installation. It is however to be understood that a corresponding function may also be given in an air conditioning installation.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A heating installation and/or air conditioning installation comprising:
    at least one circulation pump assembly forming a main pump comprising:
        an electric drive motor, and
        a control device integrated into the at least one circulation pump assembly for the control of the drive motor, the control device comprising a communication interface;
    at least one temperature sensor connected to the communication interface of the circulation pump assembly for data transmission, wherein the drive motor of the circulation pump assembly is configured to be controlled by the control device in dependence on data transmitted by the at least one temperature sensor; and
    at least one auxiliary pump connected to the communication interface for data transmission, the at least one auxiliary pump comprising a control device configured to control the auxiliary pump in dependence on data received from the circulation pump assembly, wherein the circulation pump assembly is further configured to, via the communication interface, regulate a rotational speed of the at least one auxiliary pump,
    wherein the communication interface of the main pump is designed for receiving data from the at least one auxiliary pump, and the control device of the main pump is designed to control the main pump in dependence on the received data.

2. A heating installation and/or air conditioning installation according to claim 1, wherein the communication interface is designed for wireless signal transmission by way of radio.

3. A heating installation and/or air conditioning installation according to claim 1, wherein the control device is designed in a manner such that it may send data via the communication interface to an external assembly, which is controlled in dependence of the data.

4. A heating installation and/or air conditioning installation according to claim 1, wherein the control device is designed in a manner such that via the communication interface, the control device is configured to control at least one further pump in addition to the auxiliary pump and/or an external valve and/or receive data from the at least one further pump and/or the external valve.

5. A heating installation and/or air conditioning installation according to claim 1, wherein the control device comprises a repeater for receiving and transmitting signals.

6. A heating installation and/or air conditioning installation according to claim 1, wherein the control device is formed of at least one module which is integrated into the circulation pump assembly in an exchangeable or optional manner.

7. A heating installation and/or air conditioning installation according to claim 1, wherein the at least one temperature sensor is arranged on at least one solar collector and/or on a water storage device.

8. A heating installation and/or air conditioning installation according to claim 1, with which the communication interface of the circulation pump assembly is designed for wireless signal transmission, and sensors and/or assemblies, which are provided for communication with the communication interface, are equipped with corresponding interfaces for the wireless signal transmission.

9. A heating installation and/or air conditioning installation according to claim 8, wherein at least a part of the sensors and/or assemblies is in each case equipped with a repeater for receiving and for transmission of signals.

* * * * *